UNITED STATES PATENT OFFICE.

EMIL EHRENSBERGER, OF ESSEN, GERMANY, ASSIGNOR TO FRIED. KRUPP, OF SAME PLACE.

PROCESS OF IMPROVING ARMOR-PLATES.

SPECIFICATION forming part of Letters Patent No. 653,413, dated July 10, 1900.

Original application filed April 21, 1896, Serial No. 588,513. Divided and this application filed October 19, 1899. Serial No. 734,113. (No specimens.)

*To all whom it may concern:*

Be it known that I, EMIL EHRENSBERGER, a citizen of the German Empire, residing at Essen, Germany, have invented certain new and useful Improvements in Processes of Improving Armor-Plates, of which the following is a specification, and which invention formed part of an application filed by me April 21, 1896, Serial No. 588,513.

The method or process forming the subject of the present invention has for its object the improvement of steel armor-plates by imparting to the side thereof which is exposed to the impact of projectiles the greatest suitable hardness and to the other side thereof the greatest toughness which the armor-plate material can acquire. By such construction and the mode of manufacture hereinafter described is obtained the greatest resistance to cracking and the highest degree of strength.

With this object in view my invention consists, essentially, in heating the side of the plate to be hardened to a temperature corresponding to the degree of hardness desired, while heating the other side, which is to become tough, to a heat below that necessary to produce hardening, but high enough to produce toughening, and then cooling suddenly only the side which has been heated to the higher temperature. After steel armor-plates have been improved in quality by being suddenly cooled down from a high temperature that renders the molecules capable of an easy rearrangement they may be made to acquire the quality of extreme toughness by being heated a second time to a lower temperature than the first heating and by being allowed to cool slowly down from said temperature. These respective high temperatures will vary with the nature and composition of the steel, and hence directions cannot be given in exact degrees of temperature; but the first heating should be of such high degree as will permit easy flow or rearrangement of the molecules, and this may be obtained by heating up to about, say, 800° to 1,000° centigrade, but should stop short of the melting-point; but in order that the armor-plate shall combine the most efficient degree of hardness of one side and the greatest degree of toughness of the other side I treat the plate in the following manner: The plate is first improved in quality by being heated, as above described, to the high temperature which permits an easy or ready flow or rearrangement of the molecules, and the entire plate is then suddenly cooled from such temperature by immersion or spraying in the usual manner. I call this the "quality-improving" heat. By this means the steel acquires not only considerable hardness, but also an extreme fineness of grain or texture, which makes it capable of subsequently acquiring the greatest degree of toughness; but as the hardness is now too great to allow of machining or shaping the plate the temper should be then drawn and the plate be then machined or shaped as may be desired, or the plate is heated to a temperature at which hardening will not take place and the plate is then cooled suddenly from this temperature. Then the plate can be machined or shaped while cold. This heat I call the "annealing" heat. The plate having been thus properly worked, one side—viz., the side intended to be exposed to the impact of projectiles—is heated to a temperature adapted to produce the required degree of hardness. This I call the "hardening" heat, and the other or rear side is heated to a temperature below that to which the exposed side is heated. This latter temperature should be such as to produce toughness in the highest degree and will be a red heat. This I call the "toughening" heat. The hardening heat ranges from 750° to 900° centigrade, according to the intensity of the quality-improving heat, and the toughening heat ranges from 500° to 700° centigrade. The plate is then suddenly cooled by immersing or spraying only that side which is intended to acquire maximum hardness; but if this treatment is not sufficient, as in the case of a very thick plate, to cause the rear side of the plate to acquire sufficient toughness then the entire plate should be immersed or sprayed. The operation of immersing or spraying one side of the plate may be adopted when owing to the material employed the rear side of the plate would become hard by the immersion of the entire plate, or when in the case of a
thin plate the sudden cooling of one side at
the same time produces sudden cooling of
the rear side. The sudden cooling of the
rear side of the plate is superfluous in case
that side of the plate has previously acquired
the maximum toughness.

The heating of the two sides is preferably
effected for practical reasons at one and the
same time by bringing those parts which are
to be more intensely heated rapidly to the
said higher temperature, while those parts
which are not to be heated so intensely are
either embedded in sand or placed upon a
rather cool hearth, and thus withdrawn from
the direct or full action of the furnace, or they
may be placed on a hollow frame and kept
at the suitable lower temperature by means
of cooling-gases introduced into such hollow
frame, or, less practically but productive of
the same result, the more intense heating of
the surface to be hardened and the sudden
cooling thereof may be caused to follow on
or it may precede the heating of the other
side to the lower temperature and the sudden
cooling or the slow cooling thereof.

It will be understood that this process is
suitable for armor-plates of homogeneous steel
and alloys of steel—such as chrome-steel,
wolfram-steel, nickel-steel, chrome-nickel
steel, &c.—as well as for cemented, compound,
and other plates. In the case of cemented
plates the first quality-improving heat may
be dispensed with, because the heating nec-
essary for the cementing process may be util-
ized at the same time for the operation of im-
proving the grain or texture. Moreover, in
cases in which the alteration or distortion of
shape produced by the quality-improving
heat required for the improvement of the
grain or texture is not important the anneal-
ing heat, which would be otherwise necessary
for the shaping and machining operations
and which is interposed between the quality-
improving heat and the hardening and tough-
ening heat, (which heats are of different tem-
peratures,) may be dispensed with, because
the shaping of the plates may in such case be
effected previously thereto; but if this an-
nealing heat has been effected and if the op-
eration was such as to impart the required
maximum toughness to the back of the plate
any desired temperature may be employed in
the subsequent treatment which does not ex-
ceed the temperature of the annealing heat.

In conclusion it may be stated that the
herein-described operation which precedes
the actually novel part of the process—that is
to say, the first operation for the purpose of
improving the grain or texture of the mate-
rial and also the second operation for facili-
tating the machining and shaping of the ma-
terial—may be replaced by similar or equiv-
alent treatments without altering the essen-
tial nature of the process. For instance, the
plates to be hardened on one side only may
have imparted to them a suitable grain or
texture by being rolled at a low temperature
before their parts are differently heated.

What I claim as new is—

1. The herein-described process for impart-
ing special hardness to one side and maximum
toughness to the other side of plates made of
steel, or mixture of steel capable of being
hardened, consisting in heating the side
which is to be hardened to a temperature cor-
responding to the degree of hardness desired,
while heating the other side, which is to be-
come tough, to a heat below that necessary
to produce hardening but high enough to pro-
duce toughening, and then cooling suddenly
only the side which has been heated to the
higher temperature.

2. The herein-described process for impart-
ing special hardness to one side and maximum
toughness to the other side of plates made of
steel, or mixtures of steel capable of being
hardened, consisting in first subjecting the
plate to a high temperature permitting an
easy molecular rearrangement, then suddenly
cooling the plate, then heating the side which
is to be hardened to a temperature corre-
sponding to the degree of hardness desired,
while heating the other side, which is to
become tough, to a lower heat and below
that necessary to produce hardening, and
then cooling suddenly only the side which
has been heated to the higher temperature.

3. The herein-described process for impart-
ing special hardness to one side and maximum
toughness to the other side of plates made of
steel, or mixtures of steel capable of being
hardened, consisting in first subjecting the
plate to a high temperature permitting an
easy molecular rearrangement, then suddenly
cooling the plate, then heating the plate to a
low heat, not high enough to produce har-
dening, then cooling and shaping the plate
after cooling; then reheating the side of the
plate which is to be hardened to a tempera-
ture corresponding to the degree of hardness
desired, while heating the other side which is
to become tough to a red heat below that nec-
essary to produce hardening, and then cool-
ing suddenly only the side which had been
heated to the higher temperature.

In testimony whereof I have hereunto set
my hand in the presence of two subscribing
witnesses.

EMIL EHRENSBERGER.

Witnesses:
WILLIAM ESSENWEIN,
GEO. P. PETTIT.